United States Patent [19]

Mitchell

[11] Patent Number: 5,417,611
[45] Date of Patent: May 23, 1995

[54] DRIVING CONNECTIONS BETWEEN TWO ROTATABLE BODIES

[75] Inventor: Stephen W. Mitchell, Bury, England

[73] Assignee: British Technology Group Limited, London, England

[21] Appl. No.: 64,129

[22] PCT Filed: Sep. 30, 1991

[86] PCT No.: PCT/GB91/01680
§ 371 Date: May 21, 1993
§ 102(e) Date: May 21, 1993

[87] PCT Pub. No.: WO92/06282
PCT Pub. Date: Apr. 16, 1992

[30] Foreign Application Priority Data

Oct. 1, 1990 [GB] United Kingdom ............... 9021270

[51] Int. Cl.$^6$ ............................ F01L 1/34; F16D 3/04
[52] U.S. Cl. ................................ 464/102; 74/568 R; 123/90.17
[58] Field of Search ................ 464/102, 104, 110; 123/90.17, 90.31; 74/568 R, 571 L

[56] References Cited

U.S. PATENT DOCUMENTS

| Re. 31,917 | 6/1985 | Mitchell | 123/90.31 |
|---|---|---|---|
| 3,010,339 | 11/1961 | Brock | 74/568 |
| 3,491,604 | 1/1970 | Levi | 74/63 |
| 4,505,235 | 3/1985 | Mitchell | 123/90.17 |
| 4,872,428 | 10/1989 | Mitchell | 123/90.17 |

FOREIGN PATENT DOCUMENTS

| 0179581 | 4/1986 | European Pat. Off. . |
|---|---|---|
| 2066361 | 7/1984 | United Kingdom . |
| 2206179 | 12/1988 | United Kingdom . |

OTHER PUBLICATIONS

Automotive Engineering, vol. 88, No. 10, 10 Oct. 1980, Dallas, pp. 120–124; D. Scott: 'eccentric cam drive varies valve timing.

Primary Examiner—Daniel P. Stodola
Assistant Examiner—Eileen A. Dunn
Attorney, Agent, or Firm—Cushman, Darby & Cushman

[57] ABSTRACT

A driving connection between a hollow camshaft (1) and its driving shaft (5) located within it, the axes (3, 8) of these two members being parallel but laterally displaceable to vary the characteristics of rotation of the camshaft in response to constant-speed rotation of the driving shaft. The camshaft supports a slideway (11) in which moves a slider (12) which makes a rotary joint with the end of an arm (15) carried by the driving shaft. The geometry of the arm is such that the center of rotation (18) of the rotary joint lies within the outline of the periphery of the driving shaft (5) when viewed along its axis (8), thus promoting radial compactness. The essential component of the arm may be an item (15) of crescent-shaped cross-section, the concave surface (19) of the crescent registering with the surface of the driving shaft.

8 Claims, 1 Drawing Sheet

DRIVING CONNECTIONS BETWEEN TWO ROTATABLE BODIES

BACKGROUND OF THE INVENTION

1. Field of the Invention

This invention relates to driving connections between two rotatable bodies having parallel but laterally-displaceable axes of rotation, the first body being hollow and the second body being located within it. The invention applies particularly to connections in which the two bodies are both shafts, the first body being a hollow shaft and the second body—which is probably solid and the driving member of the combination - being located within it.

2. Description of Related Art

The presently claimed invention thus relates especially to mechanisms of the kind described in Patent Specifications GB-B-2066361 and GB-A-2206179 which operate the valves of Internal combustion engines, which are capable of varying the valve timing during operation to suit changes in operating conditions, and in which hollow camshafts are driven by solid driving shafts located within them.

The connections between the driving shafts and camshafts, described by way of example in specification GB-B-2066361, are suitable for an engine with in-line cylinders, but with the inlet valves of the cylinders offset from the outlet valves relative to that line. The invention behind specification GB-A-2206179 arose from the need for a mechanism capable of use in a compact engine in which the cylinders are in-line, and in which the inlet and exhaust valves are also in-line with the cylinder centers. Another factor behind that invention was an increasing preference for valve-operating cams to operate directly onto bucket tappets, instead of onto rockers or levers as in GB-B-2066361.

In the design shown by way of example in specification GB-A-2206179, the driving connection between a central driving shaft and the hollow camshaft that surrounds it is made by way of an arm which projects radially from the driving shaft. The outer end of the arm has the shape of part of a cylinder whose axis lies parallel to that of the shaft. The outer end thus has a part-circular outline, and this engages rotatably in a corresponding recess formed Within a block which is mounted to slide in a radial slot formed within a flange mounted on the hollow camshaft. Such a connection has the advantage of being very compact axially, because all the essential components just recited lie in the same transverse plane relative to the axes of rotation of the driving and driven members, unlike the connections of GB-A-2066361 and also EP-A-0179581, in both of which there is an axial gap, spanned by a pin or the like, within the driving connection between the two rotatable bodies.

SUMMARY OF THE INVENTION

The present invention arises from appreciating the benefit of adding, to the axial compactness of the design of GB-A-2206179, the potential of greater radial compactness and in particular a reduction in the radius Y between the axis of the driving shaft and the center of rotation of the rotary joint. With such a driving connection, the obtainable range of variation of valve timing is proportional to the function X/Y, where X is the distance by which the axes of the driving and driven shafts can move apart, and Y is as defined above. In any practical design the maximum value of quantity X will be limited by the bore of the hollow driven camshaft, because any Increase In that dimension tends also to increase both the frictional losses at the hollow camshaft bearings, and also the surface speed and frictional losses at the surfaces of the driven cams because the cam base circle diameter must Increase In proportion. It is therefore advantageous to maximise the value of function X/Y by minimising the value of Y.

The invention is defined by the claims, the disclosure of which is to be read as included within the disclosure of this specification, and includes driving connections and valve-timing mechanisms as described by way of example with reference to the accompanying diagrammatic drawings.

DESCRIPTION OF THE PREFERRED EMBODIMENTS

Figure 1A:
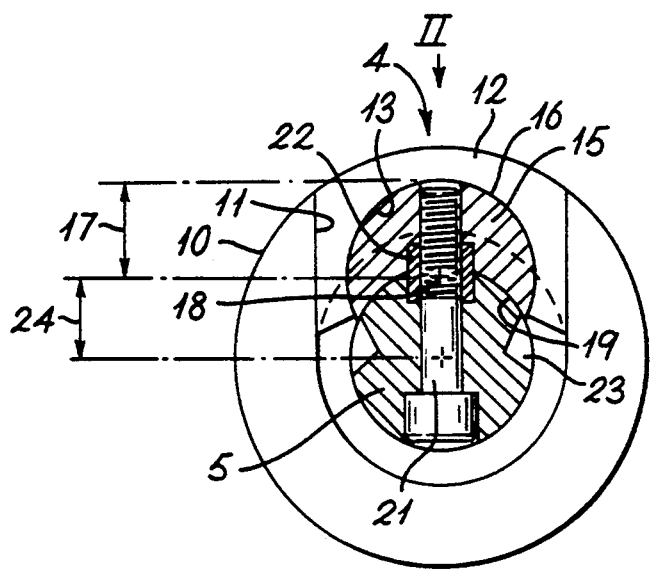
FIG. 1A is a transverse section through driving and driven shafts and the driving connection between them.
Figure 2:
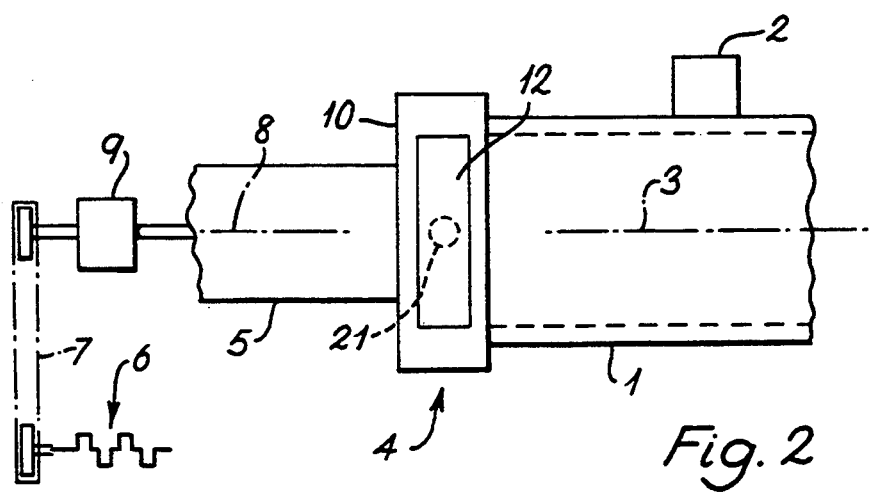
FIG. 2 is a plan view In the direction of the arrow II in FIG. 1.

A hollow camshaft 1, carrying at least one valve-operating cam indicated at 2, rotates about a fixed axis 3 and is driven, by means of a driving connection indicated generally at 4, by a solid driving shaft 5 which will itself typically be driven from an engine crankshaft 6 by way of a chain 7, the last two parts being shown only schematically in FIG. 2. The axis 8 of shaft 5 is always parallel to axis 3 of shaft 1, and in FIG. 1A the two axes coincide, but axis 8 can be moved transversely, by mechanism shown only schematically at 9 but of a kind well known in the art and described in detail for instance in specification GB-B-2066361, to vary the pattern of rotation of camshaft 1 in response to driving shaft 5, and so vary the timing of the opening and closing of the valves of the engine by the cams 2. The shaft 5 and camshaft 1 correspond respectively to the first and second bodies recited in the claims.

Camshaft 1 carries a flange 10 formed with a radial slot 11, in which a slider 12 is mounted to slide. Slider 12 is formed with a part-cylindrical cavity 13, the axis of which lies parallel to axes 3 and 8. A matching part-cylindrical member 15, having an axial length corresponding to that of slider 12, presents a convex surface region 16 equal in radius (17) to cavity 13 of slider 12, so that items 12 and 15 act as the two halves of a rotary joint having a center and axis of rotation 18. The curvature of the concave surface region 19 of member 15 matches and registers with the surface of shaft 5, and in the example shown in FIGS. 1A and 2 shaft 5 and member 15 are held together by a socket head cap screw 21 and located relative to each other by a hollow locating dowel 22. In an alternative embodiment, member 15 could be more permanently fixed to shaft 5, for example by rivetting, or could even be integral with it.

Figure 1B:
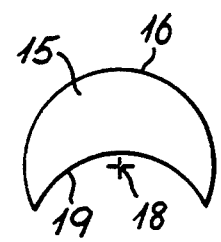
FIG. 1B shows one embodiment of a rotary arm portion.

From FIG. 1A it is thus apparent that the combination of shaft 5 and member 15 constitutes an arm, rotatable about the shaft axis 8. The driving mechanism of which that arm is a part is clearly capable, as the distance between axes 3 and 8 varies, of varying the drive imparted to camshaft 1, essentially in the same manner as the linkages described in specification GB-A-2206179. The periphery of the shaft 5 is formed with small cut-outs 23, in the vicinity of the slider 12, which allow clearance for the increasing tilting movement that the slider makes, relative to shaft 5, during each revolution as the separation of axes 3 and 8 increases towards a maximum. FIG. 1A best illustrates the feature of the present invention that the area of the cross-section of the arm, just referred to, is essentially the sum of the areas of the cross-sections of shaft 5 and of member 15. The consequence of the respectively convex and concave shapes of the surface regions 16 and 19 of member 15 is to diminish the distance—indicated 24 in FIG. 1A—between the axis 8 and the center of curvature 18. This helps to diminish the value of the function X/Y, with the effect and advantages already described. As FIG. 1 shows, when the member 15 is so constructed and mounted the center of rotation 18 of rotary joint 12/15 lies within the outline of the periphery of the shaft 5 when viewed along its axis, and the distance between center 18 and axis 8 is thus less than the radius of shaft 5: such a low value would be quite unobtainable in any of the constructions described by way of example in specification GB-A-2206179, where the quite different shape of the driving member (2) has the consequence that the distance between the shaft axis (20) and the center of curvature (33) of the rotary joint must always exceed the shaft radius.

In the alternative embodiment of the invention, already mentioned, in which shaft 5 and member 15 are integral, the notional boundary between the two, corresponding to concave surface 19 in FIG. 1A, will of course be defined by the notional projection of the periphery of the shaft. Where the shaft is of circular section, as shown, that periphery will be circular, but the invention includes mechanisms in which the driving shaft is of non-circular outline, and the actual or notional boundary between the shaft and the member 15 is the projection of such a non-circular outline.

Figure 3:
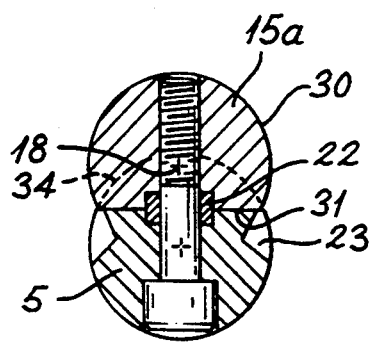
FIG. 3 shows a detail of an alternative construction, in transverse section.
Figure 4:
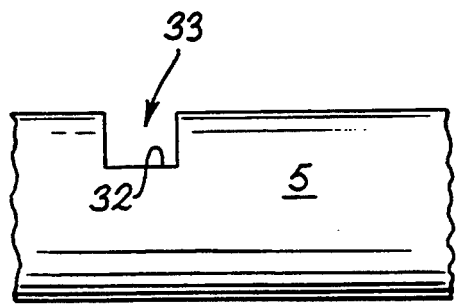
FIG. 4 shows the driving shaft of FIG. 3 in elevation.

In the alternative construction of FIGS. 3 and 4 the member 15a, instead of being crescent-shaped in section like the corresponding member 15 in FIGS. 1A and 2, has instead the sectional shape of an incomplete circle bounded by the circumference 30 and a chord 31, which engages with the base 32 of a transverse slot 33 formed in the shaft 5. As in previous figures, the shaft and the member 15a are located and held together by a dowel 22 and screw 21. It will be apparent that circumference 30 of member 15a presents the necessary convex surface (16) for a rotary joint as before, and that the distance 24 between center 18 and axis 8 is again less than the radius of shaft 5. It should also be noted that although the shape of components 5, 15a as shown In section in FIG. 3 is different from the shape of the corresponding components (5, 15) as shown in similar section in FIG. 1, the cross-sectional area of the "arm" formed by the combination of the two components is the same as before, and equals the sum of two parts. The first of those parts is the cross-section of shaft 5 as enclosed within the periphery of that shaft, reference 34 indicating the continuation of the outline that periphery where obscured by member 15a. The second part of the area is crescent-shaped as in FIG. 1A and is bounded on one side by circumference 30 (16) and on the other by line 34.

Finally it should be noted that although It may in practice often be convenient for members 15, 15a to be equal in radius to shaft 5, as shown in FIGS. 1A and 3, the invention also includes driving connections in which a circular driving shaft is either greater or smaller in radius than the rotary joint which the arm makes with the slider.

I claim:

1. A driving connection between rotatable bodies, comprising:
    a rotatable and hollow first body having an axis of rotation; and
    a rotatable second body having an axis of rotation and disposed within said second body;
    wherein said axes of rotation of said first and second bodies are parallel and laterally displaceable relative to one another,
    wherein said second body includes a radially extending rotary arm portion and said first body includes a radially extending slideway, said slideway having a slider slidably disposed therein,
    wherein said slider and said rotary arm have matched curved surfaces which engage to define a rotary joint, said curved surface of said rotary arm having a center of curvature that lies within a projected cross-sectional periphery of said second body.

2. A driving connection according to claim 1, wherein said second body is a shaft.

3. A driving connection according to claim 2, wherein an area of a section through said rotary arm, taken in a plane transverse to said axis of rotation of said shaft, includes a first part having the cross-sectional area enclosed by a periphery of said shaft, and a second part defined by a boundary including a first convex region corresponding to said curved surface of said rotary arm and a second concave region corresponding to a periphery of said shaft.

4. A driving connection according to claim 3, wherein said second part of said area of the section through said rotary arm is crescent-shaped.

5. A driving connection according to claim 2, wherein said body is a hollow camshaft which is rotatably driven by said second body.

6. A driving connection according to claim 1, wherein said rotary arm and said second body are integral with each other.

7. A driving connection according to claim 1, wherein said rotary arm and said second body are separate, but secured together.

8. A driving connection according to claim 5, wherein a slot is formed in said second body, and a radially proximal portion of said rotary arm fits within said slot.

* * * * *